(12) United States Patent
Foster

(10) Patent No.: US 8,171,793 B2
(45) Date of Patent: May 8, 2012

(54) SYSTEMS AND METHODS FOR DETECTING OUT-OF-PLANE LINEAR ACCELERATION WITH A CLOSED LOOP LINEAR DRIVE ACCELEROMETER

(75) Inventor: Michael J. Foster, Issaquh, WA (US)

(73) Assignee: Honeywell International Inc., Morristown, NJ (US)

( * ) Notice: Subject to any disclaimer, the term of this patent is extended or adjusted under 35 U.S.C. 154(b) by 786 days.

(21) Appl. No.: 12/183,678

(22) Filed: Jul. 31, 2008

(65) Prior Publication Data

US 2010/0024552 A1 Feb. 4, 2010

(51) Int. Cl.
*G01P 15/125* (2006.01)
*G01P 15/02* (2006.01)
*G01C 19/00* (2006.01)

(52) U.S. Cl. ............. 73/514.32; 73/514.38; 73/504.14

(58) Field of Classification Search ............. 73/514.32, 73/514.29, 514.36, 514.38
See application file for complete search history.

(56) References Cited

U.S. PATENT DOCUMENTS

| | | | | |
|---|---|---|---|---|
| 5,596,144 A * | 1/1997 | Swanson | ............. | 73/514.18 |
| 5,597,956 A * | 1/1997 | Ito et al. | ............. | 73/514.18 |
| 5,905,203 A * | 5/1999 | Flach et al. | ............. | 73/514.32 |
| 6,000,287 A * | 12/1999 | Menzel | ............. | 73/514.32 |
| 6,230,566 B1 * | 5/2001 | Lee et al. | ............. | 73/514.32 |
| 6,481,283 B1 | 11/2002 | Cardarelli | | |
| 6,841,992 B2 | 1/2005 | Yue et al. | | |
| 6,935,175 B2 | 8/2005 | Eskridge et al. | | |
| 7,022,543 B2 | 4/2006 | Eskridge et al. | | |
| 7,069,784 B1 | 7/2006 | Eskridge | | |
| 7,140,250 B2 * | 11/2006 | Leonardson et al. | ...... | 73/504.14 |
| 7,146,856 B2 | 12/2006 | Malametz | | |
| 7,210,352 B2 * | 5/2007 | Foster et al. | ............. | 73/514.32 |
| 7,293,460 B2 * | 11/2007 | Zarabadi et al. | ............. | 73/514.32 |
| 7,343,801 B2 * | 3/2008 | Kapser et al. | ............. | 73/514.32 |
| 7,418,864 B2 * | 9/2008 | Asami et al. | ............. | 73/514.32 |
| 7,426,863 B2 * | 9/2008 | Kuisma | ............. | 73/514.32 |
| 7,469,588 B2 * | 12/2008 | LaFond et al. | ............. | 73/514.32 |
| 7,516,661 B2 * | 4/2009 | Klein et al. | ............. | 73/514.32 |
| 7,870,788 B2 * | 1/2011 | Pike et al. | ............. | 73/514.32 |
| 2004/0035206 A1 * | 2/2004 | Ward et al. | ............. | 73/514.32 |
| 2004/0160232 A1 | 8/2004 | Yue et al. | | |
| 2005/0109109 A1 | 5/2005 | Eskridge et al. | | |
| 2005/0139942 A1 | 6/2005 | Eskridge et al. | | |
| 2005/0268719 A1 | 12/2005 | Malametz | | |
| 2006/0185433 A1 | 8/2006 | Leonardson et al. | | |
| 2007/0193380 A1 | 8/2007 | Klein et al. | | |
| 2008/0142913 A1 | 6/2008 | Foster et al. | | |

OTHER PUBLICATIONS

Pilchowski, Jorg et al., Sensor with Position-Independent Drive Electrodes in Multi-Layer Silicon on Insulator Substrate, U.S. Appl. No. 11/829,014, filed Jul. 26, 2007.

* cited by examiner

*Primary Examiner* — Helen C. Kwok
(74) *Attorney, Agent, or Firm* — Lowe Graham Jones PLLC

(57) ABSTRACT

Systems and methods sense out-of-plane linear accelerations. In an exemplary embodiment, the out-of plane linear accelerometer is accelerated in an out-of-plane direction, wherein the acceleration generates a rotational torque to an unbalanced proof mass. A rebalancing force is applied to at least one plurality of interleaved rotor comb tines and stator comb tines, wherein the rebalancing force opposes the rotational torque, wherein the rotor comb tines are disposed at an end of the unbalanced proof mass, and wherein the stator comb tines are disposed on a stator adjacent to the end of the unbalanced proof mass. An amount of acceleration is then determined based upon the applied rebalancing force.

17 Claims, 4 Drawing Sheets

SYSTEMS AND METHODS FOR DETECTING OUT-OF-PLANE LINEAR ACCELERATION WITH A CLOSED LOOP LINEAR DRIVE ACCELEROMETER

BACKGROUND OF THE INVENTION

A conventional out-of-plane Micro-Electro-Mechanical Systems (MEMS) device, such as an accelerometer, may include one or more silicon proof masses mechanically coupled to and suspended from a substrate, typically glass, using one or more silicon flexures. A number of recesses etched into the substrate allow selective portions of the MEMS device to move freely within an interior portion of the MEMS device. In certain designs, substrates can be provided above and below the silicon structure to sandwich the proof masses between the two substrates. An out-of-plane MEMS device may be used to determine an out-of-plane linear acceleration by measuring exerted acceleration forces which displace portions of the proof mass.

The movable portion of the proof mass of an accelerometer, referred to herein as a rotor, and an adjacent, fixed portion of the MEMS device, referred to herein as a stator, are separated by a gap. The gap is typically filled with air or another suitable gas such that the proof mass rotor is free to move in response to acceleration of the MEMS device. The gap between the proof mass rotor and the fixed stator define a capacitance.

In an open loop operated MEMS device, changes in the capacitance, induced by movement of the proof mass rotor with respect to the stator, is detectable. Based upon the detected change in capacitance, the amount of linear acceleration of the MEMS device can be determined.

However, the movement of the proof mass rotor necessarily causes a geometry change between the rotor and the stator. Since capacitance between the rotor and the stator is proportional to the coupled rotor/stator area divided by the separation distance squared [Force=fn(Area/Distance$^2$)], changes in the geometry between the rotor and the stator affect force in a non-linear manner. Such non-linear changes in force significantly complicate the process of determining the acceleration of the MEMS device and may introduce error in the determination of the acceleration. Accordingly, it is desirable to substantially prevent and/or control movement of the rotor with respect to the stator so that the nonlinear changes in force between the rotor and the stator are minimized.

SUMMARY OF THE INVENTION

Systems and methods of sensing out-of-plane linear accelerations are disclosed in a closed loop operated MEMS device. In an exemplary embodiment, the out-of plane linear accelerometer is accelerated in an out-of-plane direction, wherein the acceleration generates a rotational torque to an unbalanced proof mass. A rebalancing force is applied to at least one plurality of interleaved rotor comb tines and stator comb tines, wherein the rebalancing force opposes the rotational torque, wherein the rotor comb tines are disposed at an end of the unbalanced proof mass, and wherein the stator comb tines are disposed on a stator adjacent to the end of the unbalanced proof mass. An amount of acceleration is then determined based upon the applied rebalancing force.

In accordance with further aspects, an exemplary embodiment has an unbalanced proof mass with a first proof mass portion defined by a first mass and a second proof mass portion defined by a second mass, the second mass being different from the first mass; a plurality of first proof mass comb tines at a first end of the unbalanced proof mass; a plurality of first stator comb tines interleaved with the plurality of first proof mass comb tines, the plurality of first stator comb tines offset from the first plurality of proof mass comb tines; a plurality of second proof mass comb tines at a second end of the unbalanced proof mass; and a plurality of second stator comb tines interleaved with the plurality of second proof mass comb tines, the plurality of second stator comb tines offset from the plurality of second proof mass comb tines. A controller operable to apply a rebalancing force to at least one of the plurality of interleaved first rotor comb tines and first stator comb tines and the plurality of interleaved second rotor comb tines and second stator comb tines, wherein the rebalancing force opposes a rotational torque of the unbalanced proof mass generated in response to an out-of-plane acceleration of the unbalance proof mass, wherein the controller is operable to determine an amount of acceleration based upon the applied rebalancing force.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
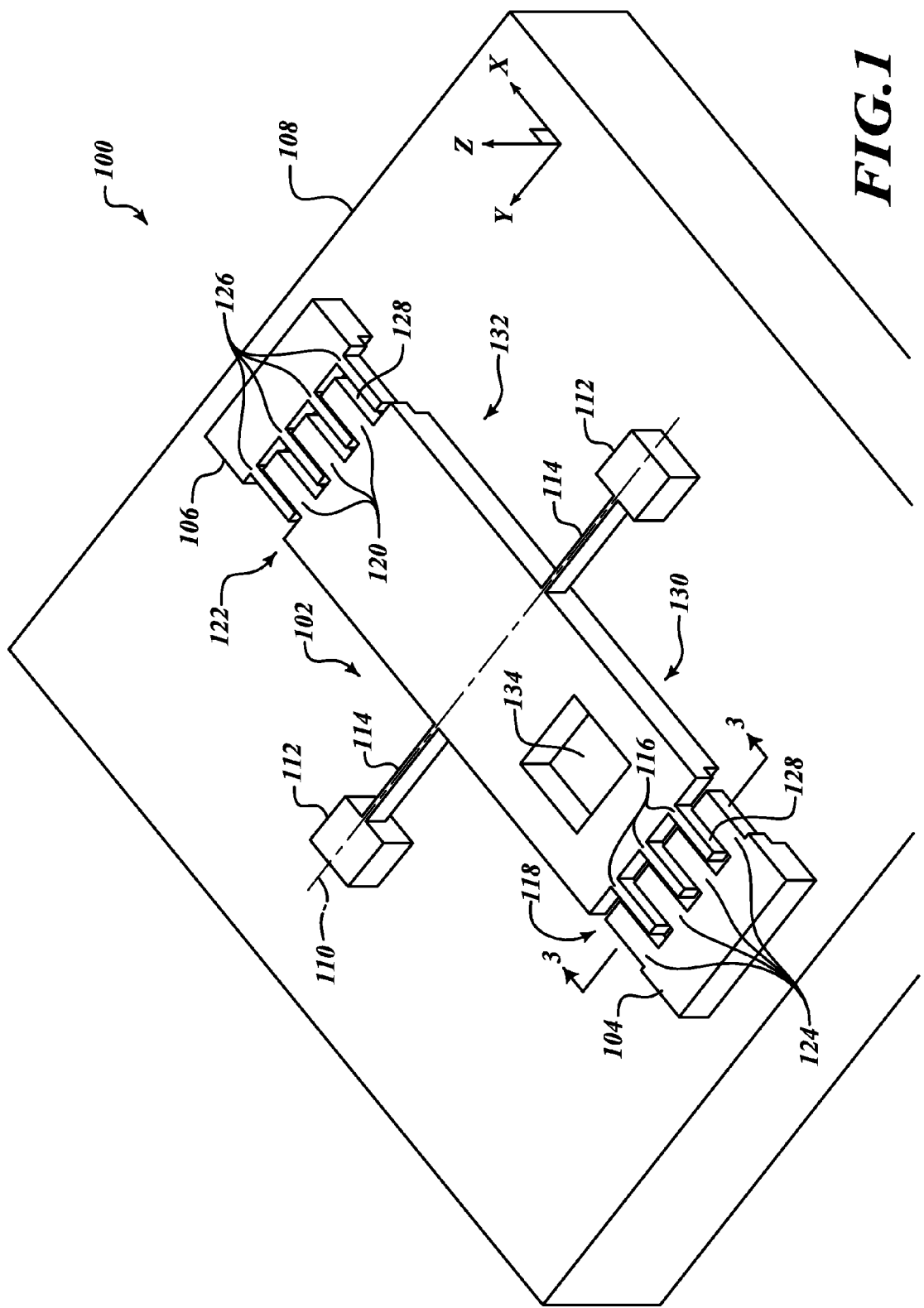
FIG. 1 is a top side perspective view of a portion of an embodiment of a closed loop linear drive accelerometer.

FIG. 1 is a top side perspective view of a portion of an embodiment of a closed loop linear drive accelerometer 100 that detects out-of-plane linear accelerations. The closed loop linear drive accelerometer 100 includes a proof mass 102, a first stator 104, a second rotor stator 106, and a portion of a substrate 108. Embodiments are fabricated using Micro-Electro-Mechanical Systems (MEMS) technologies.

An out-of-plane linear acceleration along the Z-axis will cause the pendulous proof mass 102 to rotate. The closed loop mode of operation maintains the position of the proof mass 102 in a substantially fixed position when the closed loop linear drive accelerometer 100 is subjected to the out-of-plane acceleration. That is, voltages are generated and applied to the stators 104 and 106 in an exemplary embodiment to counteract torsional forces caused by the linear acceleration The proof mass 102 is suspended above the substrate 108 so that the proof mass 102 may rotate about the illustrated axis of rotation 110 (corresponding to the illustrated Y-axis). The closed loop linear drive accelerometer 100 may be interchangeably referred to as a pendulous accelerometer 100.

Anchors 112 are bonded to the substrate 108. In some embodiments, the anchors 112 may be portions of a mechanical device layer (not shown) that is bonded to the substrate 108 (and/or bonded to an upper substrate, not shown).

Flexures 114 flexibly couple the proof mass 102 to the substrate 108, via the anchors 112. Thus, the flexures 114 substantially limit movement of the proof mass 102 along the X-axis and the Z-axis, yet permit rotation about the Y-axis in response to an out-of-plane acceleration (acceleration along the Z-axis). In some embodiments, the flexures 114 provide electrical connectivity to the proof mass 102 so that electrical signals may be picked off of, and/or applied to, the proof mass 102.

In the exemplary embodiment, the stators 104, 106 are bonded to the substrate 108 such that the stators 104, 106 are held in a fixed position with respect to the proof mass 102. In some embodiments, the stators 104, 106 may be additionally, or alternatively, bonded to an upper substrate (not shown). In other embodiments, the stators 104, 106 may be portions of a mechanical device layer (not shown) that is bonded to the substrate 108 (and/or bonded to an upper substrate). In alternative embodiments, the stators 104, 106 may be implemented as a plurality of separate stators.

An exemplary embodiment of the proof mass 102 includes a first plurality of symmetrically arranged proof mass comb tines 116 formed along a first end 118 of the proof mass 102. Additionally, a second plurality of symmetrically arranged proof mass comb tines 120 are formed along an opposing second end 122 of the proof mass 102. For illustration purposes, only three proof mass comb tines 116, 120 are illustrated. In practice, many proof mass comb tines 116, 120 would be used. In alternative embodiments, the rotors may be implemented as separate groups of rotor comb tines 116, 120.

The first stator 104 includes a corresponding number of stator comb tines 124 interleaved with the proof mass comb tines 116. Similarly, the second stator 106 includes a number of stator comb tines 126 interleaved with the proof mass comb tines 120. For illustration purposes, only three stator three comb tines 124, and four stator comb tines 126, are illustrated. In practice, many stator comb tines 124, 126 would be used.

A gap 128 separates the proof mass comb tines 116, 120 from their respective stator comb tines 124, 126. The gap 128 provides at least two functions. First, the gap 128 is sufficiently large that there is no frictional contact between adjacent comb tines so as to allow the proof mass 102 to rotate about its rotation axis 110 in response to linear accelerations along the Z-axis. Second, the gap 128 defines a capacitance between the proof mass comb tines 116 and the stator comb tines 124, and between the proof mass comb tines 120 and the stator comb tines 126.

As noted above, the proof mass 102 rotates about its rotation axis 110 in response to linear accelerations along the Z-axis. The rotation response of the proof mass 102 about the rotation axis 110 is caused by a mass imbalance between a first portion 130 of the proof mass 102 and a second portion 132 of the proof mass 102. The first portion 130 and the second portion 132 are defined by the rotation axis 110. Since the masses of the portions 130, 132 are different, a force generated by a linear acceleration of the proof mass 102 that are applied to the first portion 130 will be different from a force applied to the second portion 132. (Generally, it is known that Force=Mass times Acceleration. Thus, a linear acceleration along the Z-axis will result in different forces on the portions 130, 132 in view of their different masses. Accordingly, a rotational torque is generated by the difference in the force exerted on the first portion 130 and the force exerted on the second portion 132, which tends to rotate the proof mass 102 about its rotation axis 110).

The mass imbalance may be defined between the portions 130, 132 in a variety of manners, or combinations thereof. In one embodiment, the length of the first portion 130 may be optionally greater than the length of the second portion 132. However, in view of the location of the first end 118 of the proof mass 102 being farther away from the rotation axis 110 than the location of the second end 122, the associated moment of force at the end 118 will be different from the moment of force at end 120. Accordingly, an embodiment of the closed loop linear drive accelerometer 100 computationally accounts for this effect when applying rebalancing forces, via one or more applied voltages, and/or determining the out-of-plane acceleration.

In another embodiment, the length of the first portion 130 is substantially the same as the length of the second portion 132. Thus, the location of the ends 118 and 122 of the proof mass 102 from the rotation axis 110 are substantially the same. Accordingly, the associated moment of force at the ends 118 and 122 will be substantially the same.

The mass imbalance in embodiments where the location of the ends 118 and 122 of the proof mass 102 are substantially equidistant from the rotation axis 110 may be effected in one or more different manners. FIG. 1 illustrates an optional portion 134 of the proof mass 102 removed. The optional removal of material from one side of the proof mass 102 creates a mass imbalance between the portions 130, 132. The removed portion 134 may extend partially into the proof mass 102, or may extend all of the way through the proof mass 102. In some embodiments, the removed portion 134 may be optionally filled with a material having a different density that the material of proof mass 102. The removed portion 134 may be interchangeably referred to as a mass reduction volume 134 or a mass reduction aperture 134.

Figure 2:
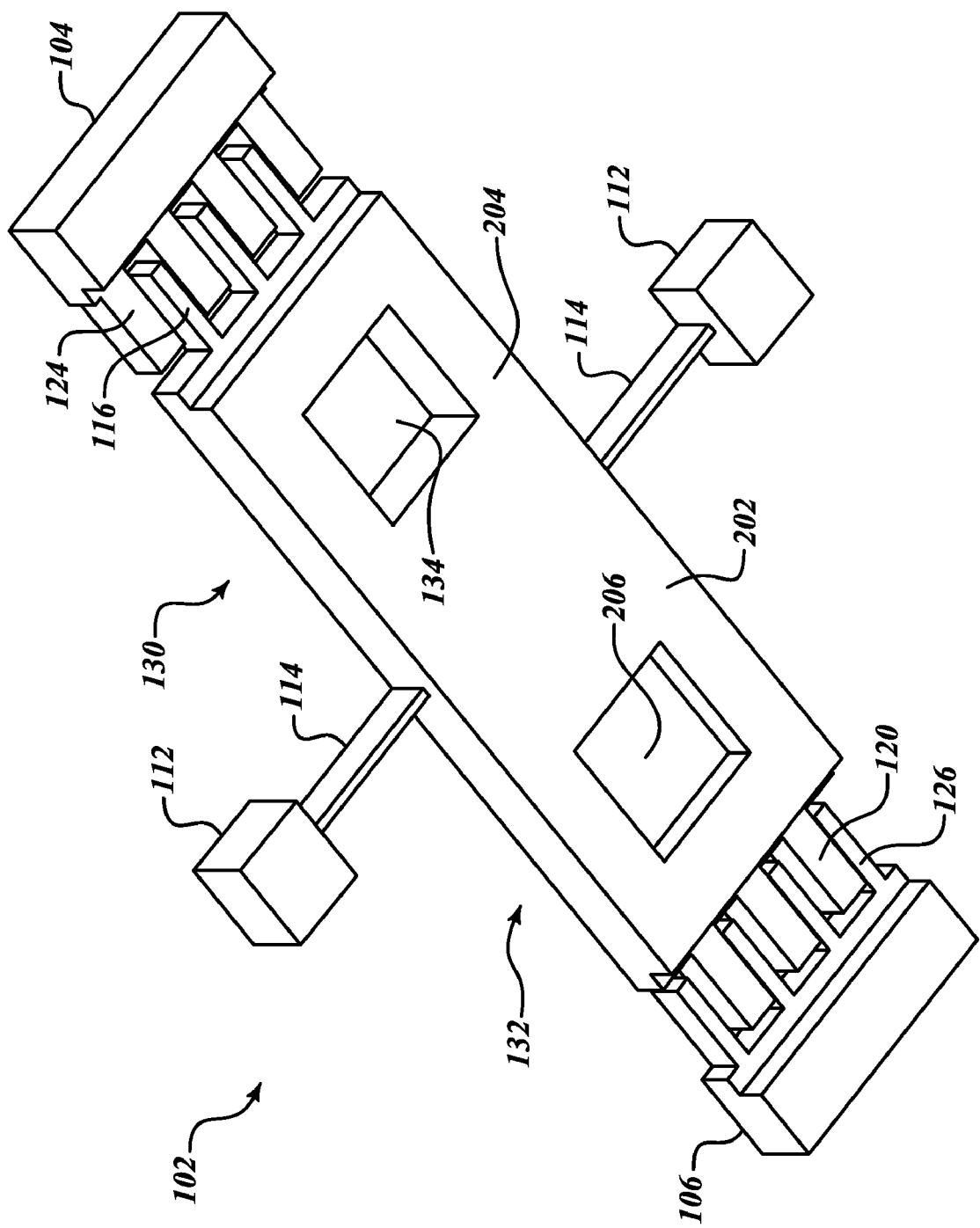
FIG. 2 is a bottom side perspective view of an embodiment of the proof mass of the closed loop linear drive accelerometer.

FIG. 2 is a bottom side perspective view of an embodiment of the proof mass of the closed loop linear drive accelerometer 100. In embodiments where the removed portion 134 extends through the proof mass 102, a surface area 202 of the first portion 130 of the proof mass 102 adjacent to the substrate 108 will be less than a surface area 204 of the second portion 132. The surface area differences may result in an undesirable imbalance in the gas dampening effect on the portion 130 and the gas dampening effect on the portion 132. In some embodiments, the imbalance in the gas dampening effects between the portions 130, 132 is computationally resolved.

In the illustrated embodiment of FIG. 2, the imbalance in the gas dampening effects between the portions 130, 132 may be optionally physically compensated for by removing a portion 206 from the bottom of the proof mass 102. The removed portion 206 may be interchangeably referred to as a gas dampening compensation volume 206. An area of the removed portion 206 has substantially the same area as the removed portion 134 extending through the proof mass 102. Accordingly, the surface areas 202 and 204 are substantially the same such that the gas dampening effects on the portions 130, 132 are substantially the same.

Alternatively, or additionally, the mass imbalance between the portions 130, 132 may be effected by making the proof mass comb tines 116 relatively smaller (less mass) than the proof mass comb tines 120. That is, the proof mass comb tines 120 may optionally have a greater mass than the proof mass comb tines 116, thereby causing the mass imbalance. To maintain the geometries of the gaps 128 such that the gaps 128 are substantially the same on both ends 118 and 122 of the proof mass 102, the stator comb tines 124 may be made relatively larger (more mass) than the stator comb tines 126.

Alternatively, or additionally, the mass imbalance between the portions 130, 132 may be effected by removing a plurality of portions of the proof mass 102, such as along the lateral edges of the proof mass 102. The effect of gas damping imbalances may be mitigated by using corresponding gas dampening compensation volumes.

Figure 3:
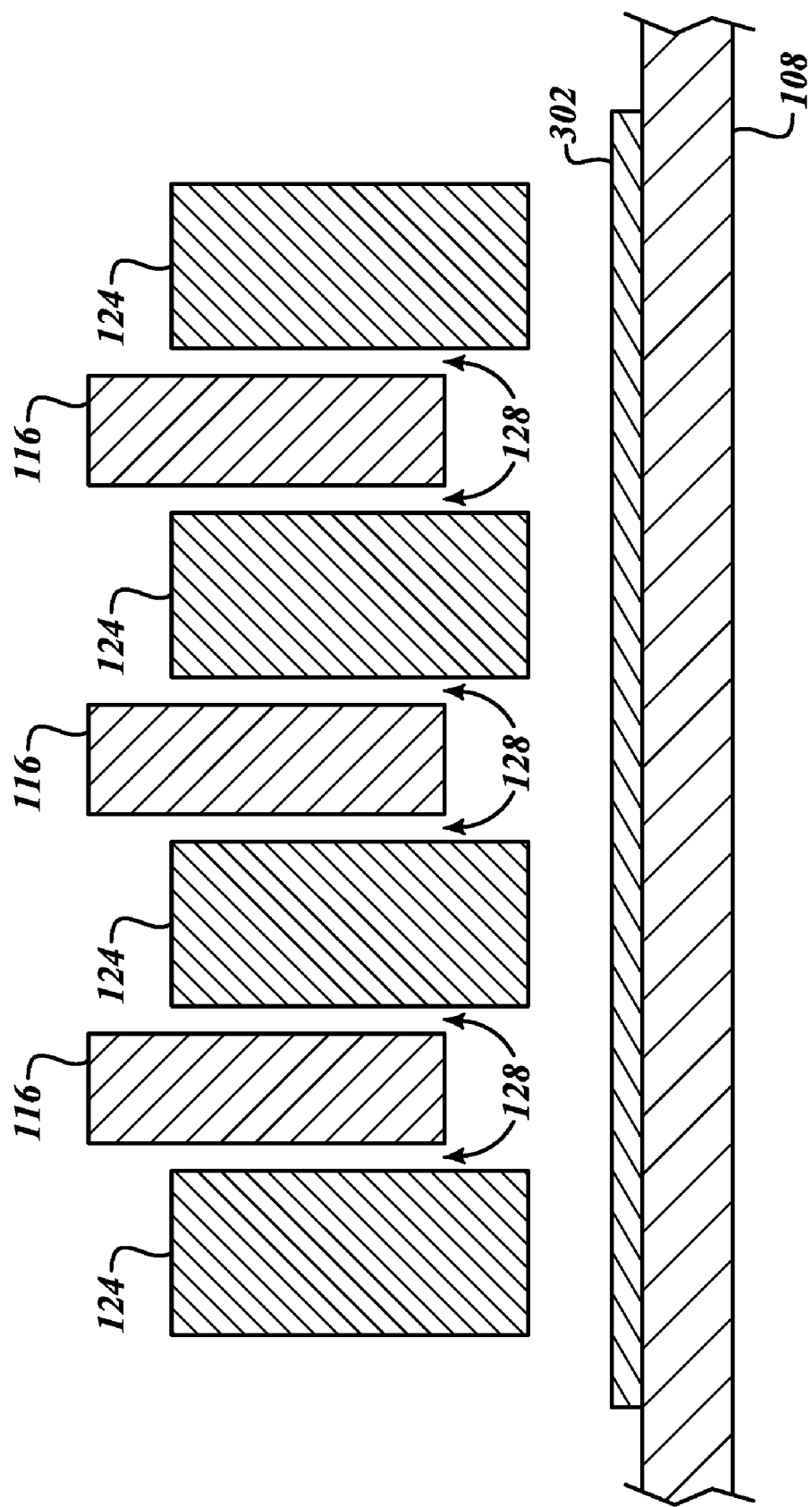
FIG. 3 is a cut away side view of the interleaved rotor tines and stator tines of the closed loop linear drive accelerometer.

FIG. 3 is a cut away side view of the interleaved rotor tines and stator times of the closed loop linear drive accelerometer 100. FIG. 3 illustrates an offset between the proof mass comb tines 116 and the stator comb tines 124. Similarly, the proof mass comb tines 120 are offset from the stator comb tines 126. The offsetting of the proof mass comb tines 116, 120 from the stator comb tines 124, 126 may be implemented by offsetting the proof mass 102 from the stators 104, 106. In other embodiments, the offsetting is fabricated into the proof mass comb tines 116, 120 and the stator comb tines 124, 126 using suitable etching and/or micromachining processes.

A portion of the substrate 108 is illustrated in FIG. 3. An optional grounding plate 302, or other suitable structure, is disposed on the substrate 108 substantially below the proof mass comb tines 116, 120 and the stator comb tines 124, 126. The grounding plate 302, coupled to a ground connection, provides a path for stray capacitances to ground, thereby improving the linearity of the closed loop linear drive accelerometer 100.

Figure 4:
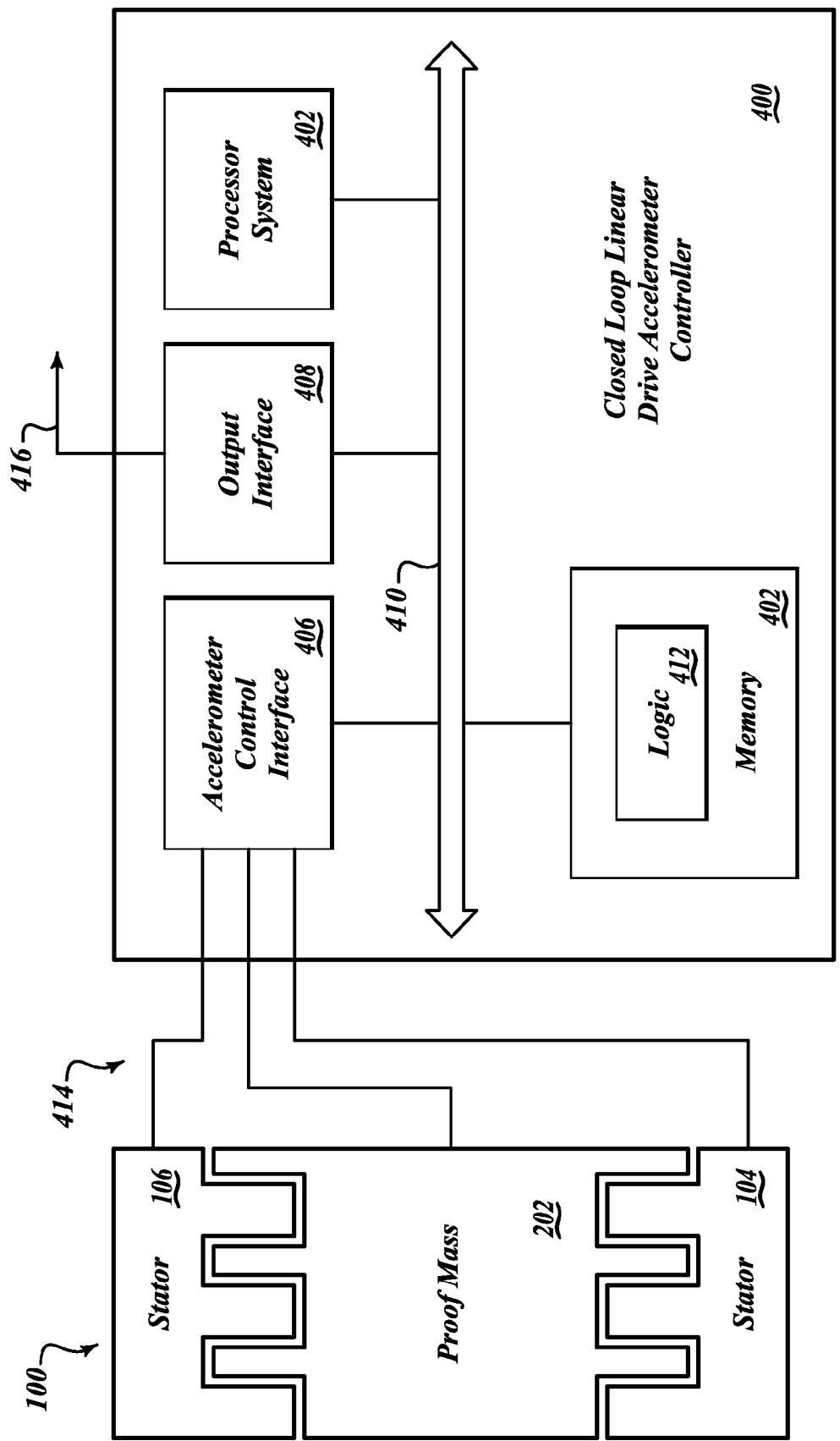
FIG. 4 is a block diagram of the control elements of an embodiment of the closed loop linear drive accelerometer.

FIG. 4 is a block diagram of the control elements of an embodiment of the closed loop linear drive accelerometer controller 400. Included are a processor system 402, a memory 404, an accelerometer control interface 406, and an output interface 408. The processor system 402, the memory 404, the accelerometer control interface 406, and the output interface 408 are coupled to a communication bus 410, thereby providing connectivity to the above-described components. In alternative embodiments of the closed loop linear drive accelerometer 100, the above-described components may be communicatively coupled to each other in a different manner. For example, one or more of the above-described components may be directly coupled to the processor system 402, or may be coupled to the processor system 402 via intermediary components (not shown). A region 412 of memory 404 stores logic for controlling the closed loop linear drive accelerometer 100, and for determining the linear acceleration of the closed loop linear drive accelerometer 100.

The accelerometer control interface 406 includes a plurality of connectors 414 that electrically couple to the proof mass 102 and the stators 104, 106. The connectors 414 are configured to transmit voltages, currents and/or signals between the controller 400 and the proof mass 102 and the stators 104, 106. In other embodiments, the connectors may be connected in different manners, and/or to other components. Further, fewer or more connectors may be used depending upon the actual configuration of the closed loop linear drive accelerometer 100. For example, the stators 104, 106 may be implemented as a plurality of separate stators, and thus, additional connectors would be required. Additionally, or alternatively, the rotors may be implemented as separate groups of rotor comb tines 116, 120, and thus, additional connectors would be required.

The output interface 408 includes one or more connectors 416 that are configured to provide the determined acceleration information to a device (not shown) which further processes the acceleration information. For example, the acceleration information may be displayed on a display, stored in a remote memory, or presented in a textual format that is printable in a report or the like.

The processor system 402 is configured to retrieve and execute the logic residing in region 412 so as to operate the closed loop linear drive accelerometer 100 in a closed loop mode of operation, also referred to as a force rebalancing mode of operation.

The closed loop mode of operation maintains the position of the proof mass 102 in a substantially fixed position when the closed loop linear drive accelerometer 100 is subjected to an out-of-plane acceleration along either Z-axis. That is, the closed loop linear drive accelerometer controller 400 is configured to generate control signals to the proof mass comb tines 116, 120 and/or the stator comb tines 124, 126 to counteract the torsional forces caused by the linear acceleration. In an exemplary embodiment, the control signal is an applied voltage.

The closed loop linear drive accelerometer controller 400, based upon the generated control signals which counteract the torsional forces caused by the linear acceleration, also determines the amount of linear acceleration. That is, since the applied control signals which counteract the torsional forces caused by the linear acceleration are known, the amount of linear acceleration may be determined therefrom.

In an exemplary embodiment, the control signal is applied to the interleaved comb tines 116, 124 in response to a rotational torque occurring in a first direction of rotation about the axis 110. Another control signal is applied to the interleaved comb tines 120, 126 in response to a rotational torque occurring in a second, opposite direction of rotation about the axis 110.

In practice, the gap between the proof mass comb tines 116, 120 and their respective stator comb tines 124, 126 is a substantially constant value since the flexures 114 substantially prohibit motion of the proof mass 102 along wither the X-axis or the Y-axis. Accordingly, the capacitance between the proof mass comb tines 116, 120 and their respective stator comb tines 124, 126 is a function of the area of capacitive coupling between the proof mass comb tines 116, 120 and their respective stator comb tines 124, 126.

As noted above, the proof mass comb tines 116, 120 are offset from the stator comb tines 124, 126. As the proof mass comb tines 116 rotate to become more in alignment with the respective stator comb tines 124, the capacitive area between the proof mass comb tines 116 and the respective stator comb tines 124 would increase. (However, since the proof mass 102 is a fixed structure, the capacitive area between the proof mass comb tines 120 and the respective stator comb tines 126 would necessarily decrease as they are pulled out of alignment.)

The capacitance between the proof mass comb tines 116, 120 and their respective stator comb tines 124, 126 is described by Equation (1) below:

$$C_{ct}(x) = \varepsilon_0 \cdot \frac{L_c \cdot x}{G_o} \cdot 2N \qquad \text{Eq. (1)}$$

In Equation (1), $\in$ is the dielectric constant of free space, $L_c$ is the length of the comb teeth, x is the overlapping thickness of the comb teeth, $G_o$ is the gap, and N is the number of comb teeth.

Equation (2) below defines the stored capacitive energy between the proof mass comb tines 116, 120 and their respective stator comb tines 124, 126.

$$W_{ct}(x) = \frac{1}{2} C_{ct}(x) \cdot V_t^2 \qquad \text{Eq. (2)}$$

Equations 3 and 4 below define the forces between the proof mass comb tines 116, 120 and their respective stator comb tines 124, 126.

$$\text{Force}(x) = -\frac{d}{dx} W_{ct}(x) \qquad \text{Eq. (3)}$$

$$Force_{ct}(x) = -\frac{1}{2}V_t^2 \cdot \varepsilon_0 \cdot \frac{L_c}{G_o} \cdot 2N \qquad \text{Eq. (4)}$$

Accordingly, the proof mass comb tines 116, 120 and their respective stator comb tines 124, 126 are offset to provide a direction to the attractive force between the comb teeth. The force between the proof mass comb tines 116, 120 and their respective stator comb tines 124, 126 acts to increase the amount of overlap between the comb tines, which also increases the capacitance. (If the comb tines are in-plane with each other, then any motion of the comb teeth would only decrease the capacitance.)

Equation (4) demonstrates that the generated force is a function of applied voltage. Accordingly, the closed loop linear drive accelerometer controller 400 may adjust the voltages applied to the stators 104, 106 to counteract the torsional forces caused by the linear acceleration.

For convenience, the proof mass 102 is illustrated as a single structure. In some embodiments, the proof mass 102 may be configured, using suitable structure (not shown), to electrically isolate the proof mass comb tines 116 from the proof mass comb tines 120. For example, the proof mass 102 may be in two parts and separately anchored. Or, an insulation barrier or the like (not shown) may be fabricated into the proof mass 102 to electrically isolate the proof mass comb tines 116 from the proof mass comb tines 120.

In some alternative embodiments of a MEMS accelerometer, such as disclosed in U.S. Pat. No. 7,146,856, entitled "Dynamically Balanced Capacitive Pick-Off Accelerometer," issued to Malametz, and which is incorporated by reference herein in its entirety, the stators are electrodes disposed on the substrate 108 below the proof mass portions 130, 132. The alternative embodiment of the unbalanced proof mass 102 includes rotor electrodes opposing the stator electrodes. The rebalancing forces are similarly applied in response to rotational torques generated by an out-of-plane linear acceleration. The mass imbalance is effected by the mass reduction aperture 134. The imbalance in the gas dampening effects between the portions 130, 132 may be physically compensated for by the gas dampening compensation volume 206 on the bottom of the proof mass 102.

In another exemplary embodiment, a MEMS device is disclosed in U.S. Pat. No. 7,140,250, entitled "MEMS Teeter-Totter Accelerometer Having Reduced Non-Linearity," issued to Leonardson et al., and which is incorporated by reference herein in its entirety. The imbalance in the gas dampening effects between the portions 130, 132 may be physically compensated for by the gas dampening compensation volume 206 on the bottom of the proof mass 102.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method that determines an out-of-plane acceleration of an accelerometer, the method comprising:
   accelerating the accelerometer in an out-of-plane direction, wherein the acceleration generates a rotational torque to an unbalanced proof mass;
   applying a rebalancing force to at least one plurality of interleaved rotor comb tines and stator comb tines, wherein the rebalancing force opposes the rotational torque, wherein the rotor comb tines are disposed at an end of the unbalanced proof mass, and wherein the stator comb tines are disposed on a stator adjacent to the end of the unbalanced proof mass; and
   determining an amount of acceleration based upon the applied rebalancing force,
   wherein the stator comb tines and the rotor comb tines are interleaved in-plane with respect to each other along an X axis and a Y axis, and wherein the stator comb tines are offset from the rotor comb tines along an out-of-plane Z axis when the proof mass is in an at-rest state.

2. The method of claim 1, wherein applying the rebalancing force comprises:
   applying a voltage to the stator comb tines, wherein the voltage generates a control signal to the stator comb tines to counteract torsional forces caused by the acceleration.

3. The method of claim 2, further comprising:
   determining the amount of acceleration based upon the applied voltage.

4. The method of claim 1, wherein the unbalanced proof mass includes a first portion defined by a first mass, wherein the unbalanced proof mass further includes a second portion defined by a second mass different from the first mass, and wherein an axis of rotation is between the first portion and the second portion.

5. The method of claim 1, wherein the rebalancing force is a first rebalancing force applied to a plurality of interleaved first stator comb tines and first rotor comb tines disposed at a first end of the unbalanced proof mass, and further comprising:
   applying a second rebalancing force to at least one plurality of interleaved second rotor comb tines and second stator comb tines, wherein the second rebalancing force opposes the rotational torque, wherein the second rotor comb tines are disposed at a second opposing end of the unbalanced proof mass, and wherein the second stator comb tines are disposed on a second stator adjacent to the second end of the unbalanced proof mass; and
   determining an amount of acceleration based upon the applied first and second rebalancing forces.

6. A closed loop linear drive accelerometer, comprising:
   an unbalanced proof mass with a first proof mass portion defined by a first mass and a second proof mass portion defined by a second mass, the second mass being different from the first mass;
   a plurality of first proof mass comb tines at a first end of the unbalanced proof mass;
   a plurality of first stator comb tines interleaved with the plurality of first proof mass comb tines, the plurality of first stator comb tines offset from the plurality of first proof mass comb tines;
   a plurality of second proof mass comb tines at a second end of the unbalanced proof mass;
   a plurality of second stator comb tines interleaved with the plurality of second proof mass comb tines, the plurality of second stator comb tines offset from the plurality of second proof mass comb tines; and
   a controller operable to apply a rebalancing force to at least one of the plurality of interleaved first proof mass comb tines and first stator comb tines and the plurality of interleaved second proof mass comb tines and second stator comb tines, wherein the rebalancing force opposes a rotational torque of the unbalanced proof mass generated in response to an out-of-plane acceleration of the unbalanced proof mass, wherein the controller is operable to determine an amount of acceleration based upon the applied rebalancing force, wherein the proof mass comb tines and the stator comb tines are interleaved in-plane with respect to each other along an X axis and a Y axis, and wherein the proof mass comb tines are offset from the stator comb tines along an out-of-plane Z axis when in an at-rest state.

7. The closed loop linear drive accelerometer of claim 6, further comprising:

at least one flexure configured to couple the unbalanced proof mass to an anchor, and configured to define an axis of rotation between the first proof mass portion and the second proof mass portion, wherein the rotational torque is about the axis of rotation.

8. The closed loop linear drive accelerometer of claim 6, wherein a first gap defines a first capacitance between the plurality of first proof mass comb tines and the plurality of first stator comb tines, wherein a second gap defines a second capacitance between the plurality of second proof mass comb tines and the plurality of second stator comb tines, and wherein a linear out-of-plane acceleration of the unbalanced proof mass generates the rotational torque changes the first capacitance and the second capacitance.

9. The closed loop linear drive accelerometer of claim 6, wherein the controller comprises:

a closed loop linear drive accelerometer controller electrically coupled to the plurality of first stator comb tines and the plurality of second stator comb tines, and configured to apply a rebalancing voltage to at least one of the plurality of first stator comb tines and the plurality of second stator comb tines that substantially counteracts a rotational torque of the unbalanced proof mass.

10. The closed loop linear drive accelerometer of claim 6, further comprising:

a ground plate disposed below at least the plurality of first proof mass comb tines and the plurality of first stator comb tines.

11. The closed loop linear drive accelerometer of claim 6, wherein a first tine mass of the first proof mass comb tines is greater than a second tine mass of the first stator comb tines, and wherein a third tine mass of the second proof mass comb tines is less than a fourth tine mass of the second stator comb tines, such that the first mass of the first proof mass portion is greater than the second mass of the second proof mass portion.

12. The closed loop linear drive accelerometer of claim 6, further comprising:

a mass reduction aperture disposed in the first proof mass portion such that the first mass of the first proof mass portion is less than the second mass of the second proof mass portion; and a gas dampening compensation volume disposed on a side of the second proof mass portion adjacent to a substrate, wherein an area of the gas dampening compensation volume is substantially equal to an area of the mass reduction aperture, wherein a gas dampening of the first proof mass portion is substantially equal to a gas dampening of the second proof mass portion.

13. A Micro-Electro-Mechanical Systems (MEMS) device comprising:

an unbalanced proof mass with a first proof mass portion defined by a first mass and a second proof mass portion defined by a second mass, the second mass being different from the first mass;

a mass reduction aperture disposed in the first proof mass portion such that the first mass of the first proof mass portion is less than the second mass of the second proof mass portion; and a gas dampening compensation volume disposed on a side of the second proof mass portion adjacent to a substrate, wherein an area of the gas dampening compensation volume is substantially equal to an area of the mass reduction aperture, wherein a gas dampening of the first proof mass portion is substantially equal to a gas dampening of the second proof mass portion;

a plurality of first proof mass comb tines at a first end of the unbalanced proof mass;

a plurality of first stator comb tines interleaved with the plurality of first proof mass comb tines, the plurality of first stator comb tines offset along an out-of-plane axis from the first plurality of proof mass comb tines;

a plurality of second proof mass comb tines at a second end of the unbalanced proof mass; and a plurality of second stator comb tines interleaved with the plurality of second proof mass comb tines, the plurality of second stator comb tines offset along the out-of-plane axis from the plurality of second proof mass comb tines.

14. The closed loop linear drive accelerometer of claim 6, wherein the controller is operable to apply a voltage control signal to the stator comb tines, wherein the voltage control signal applied to the stator comb tines is configured to counteract torsional forces caused by the out-of-plane acceleration.

15. The MEMS device of claim 13, wherein the plurality of first and second proof mass comb tines and the plurality of first and second stator comb tines are interleaved in plane with respect to each other along an X axis and a Y axis, and wherein the plurality of first and second proof mass comb tines are offset from the plurality of first and second stator comb tines along an out-of-plane Z axis.

16. The MEMS device of claim 13, wherein a first tine mass of the plurality of first proof mass comb tines is greater than a second tine mass of the plurality of first stator comb tines, and wherein a third tine mass of the plurality of second proof mass comb tines is less than a fourth tine mass of the plurality of second stator comb tines, such that the first mass of the first proof mass portion is greater than the second mass of the second proof mass portion.

17. The MEMS device of claim 13, further comprising a controller configured to apply a first voltage control signal to the first proof mass comb tines and a second voltage control signal to the second proof mass comb tines, wherein the voltage control signals applied to the proof mass comb tines are configured to counteract torsional forces caused by an out-of-plane acceleration of the MEMS device.

* * * * *